No. 834,601. PATENTED OCT. 30, 1906.
A. WOERNLE.
FOOD CUTTING AND LIFTING DEVICE.
APPLICATION FILED OCT. 12, 1905.
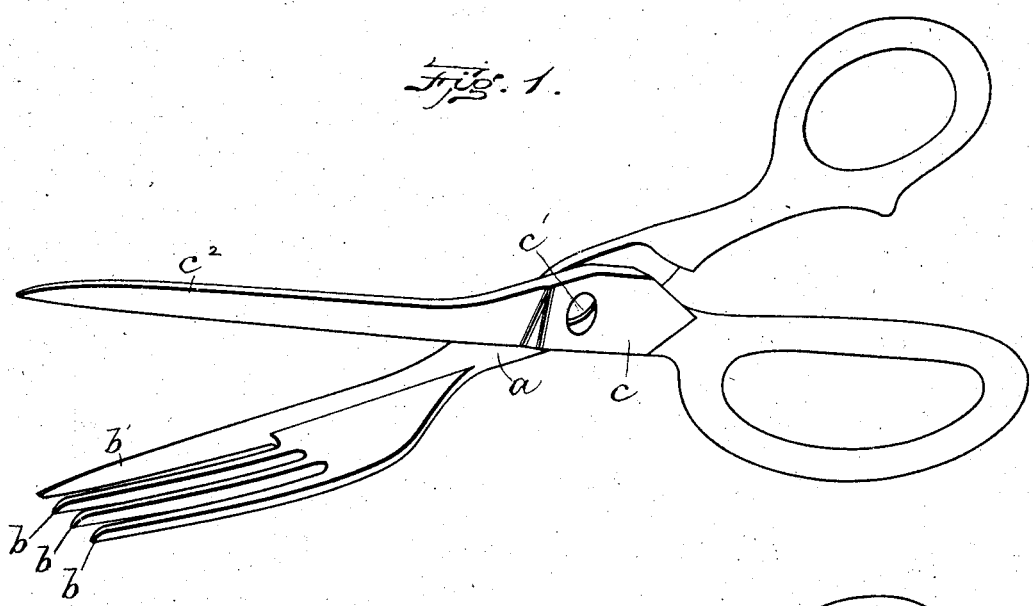
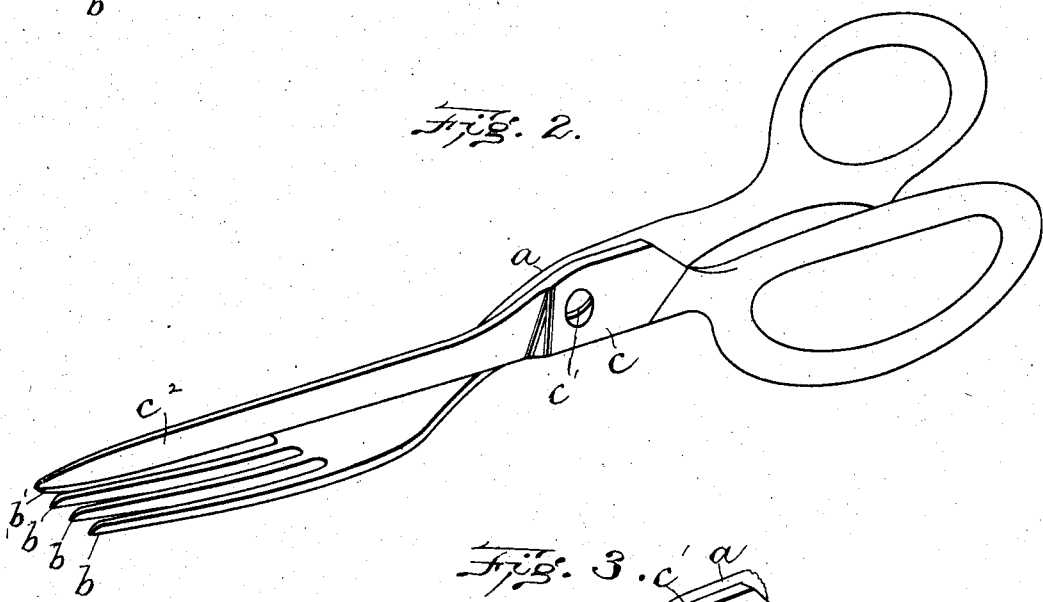
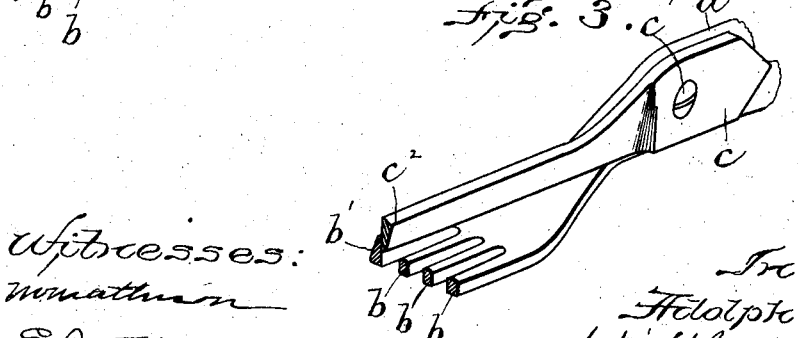

UNITED STATES PATENT OFFICE.

ADOLPH WOERNLE, OF BOSTON, MASSACHUSETTS.

FOOD CUTTING AND LIFTING DEVICE.

No. 834,601.                    Specification of Letters Patent.                    Patented Oct. 30, 1906.

Application filed October 12, 1905. Serial No. 282,392.

*To all whom it may concern:*

Be it known that I, ADOLPH WOERNLE, of Boston, in the county of Suffolk and State of Massachusetts, have invented certain new and useful Improvements in Food Cutting and Lifting Devices, of which the following is a specification.

This invention has for its object to provide a food lifting or manipulating device, such as a table-fork, with cutters for severing from a portion of food a piece of suitable size for insertion in the mouth, the piece being left on the fork so that it may be lifted directly to the mouth after being severed.

The invention consists in the improved device which I will now proceed to describe and claim.

Of the accompanying drawings, forming a part of this specification, Figure 1 represents a perspective view of a device embodying my invention, the cutters being open. Fig. 2 represents a similar view showing the cutters closed. Fig. 3 represents a fragmentary perspective sectional view.

The same letters indicate the same parts in all the figures.

In the drawings, $a$ represents a handle which supports a lifter, preferably composed of fork-tines $b\ b\ b\ b'$. The tine $b'$ at one edge of the fork is formed as a shear-blade, its upper edge being raised above the other tines and sharpened to form a shearing edge.

$c$ represents a handle pivoted at $c'$ to the handle $a$ and provided with a shear-blade $c^2$, adapted to coöperate with the blade $b'$ in severing a piece or fragment from a portion of food. The severed piece is supported by the lifter and can be conveniently transferred thereby to the mouth. The shear-blades $b'$ and $c^2$ are preferably made quite slender, so that when closed, as shown in Figs. 2 and 3, they may be inserted in the mouth as a part of the lifter without inconvenience.

My invention enables a cutter and lifter to be held by one hand as a single article instead of requiring the use of both hands, as is the case when the ordinary knife and fork are employed.

The device may be employed for cutting pies and other articles of food into pieces and lifting the pieces from the plate. When so used the lifter need not be subdivided into fork-tines.

I claim—

1. An implement of the character described, comprising a lifter having at one edge a shear-blade affixed to the lifter, the said lifter having also a handle, and a complemental shear-blade having a handle and pivoted to the lifter, the said blades being adapted to coöperate in severing a fragment from a mass, and depositing said fragment on the lifter at one side of the shear-blades.

2. An implement of the character described, comprising a fork having one of its edge tines formed as a shear-blade, and a complemental handled shear-blade, pivoted to the fork-handle, and adapted to coöperate with the said edge tine in severing a fragment from a mass and depositing said fragment on the other tines, the said shear-blades being attenuated so that when closed they may be inserted in the mouth of the user.

In testimony whereof I have affixed my signature in presence of two witnesses.

ADOLPH WOERNLE.

Witnesses:
　C. F. BROWN,
　M. MATHISON.